(12) United States Patent
Kettunen et al.

(10) Patent No.: US 6,691,751 B2
(45) Date of Patent: Feb. 17, 2004

(54) GRAPPLE HARVESTER

(75) Inventors: Veikko Kettunen, Outokumpu (FI); Kari Kinnunen, Joensuu (FI); Jussi Makkonen, Joensuu (FI)

(73) Assignee: Outokummun Metalli Oy, Outokumpu (FI)

( * ) Notice: Subject to any disclaimer, the term of this patent is extended or adjusted under 35 U.S.C. 154(b) by 53 days.

(21) Appl. No.: 10/066,740

(22) Filed: Feb. 6, 2002

(65) Prior Publication Data

US 2003/0116225 A1 Jun. 26, 2003

(51) Int. Cl.$^7$ ................................................ A01G 23/08
(52) U.S. Cl. .................... 144/4.1; 144/24.13; 144/34.1; 144/338; 144/343
(58) Field of Search ............................. 144/4.1, 24.13, 144/34.5, 336, 338, 343

(56) References Cited

U.S. PATENT DOCUMENTS

| | | | |
|---|---|---|---|
| 3,875,983 A | 4/1975 | Kurelek | |
| 3,910,326 A | * 10/1975 | Tucek | 144/34.5 |
| 4,153,087 A | 5/1979 | Stoychoff | |
| 4,243,258 A | * 1/1981 | Dauwalder | 144/4.1 |
| 4,313,479 A | * 2/1982 | Coughran, Jr. | 144/34.5 |
| 4,537,236 A | * 8/1985 | Kulju | 144/34.1 |
| 4,800,936 A | * 1/1989 | Pomies | 144/34.1 |
| 5,083,595 A | 1/1992 | Widegren | |
| 5,161,588 A | 11/1992 | Hamilton | |
| 5,163,489 A | 11/1992 | Ketonen | |
| 5,219,010 A | * 6/1993 | Eriksson | 144/24.13 |
| 5,785,101 A | * 7/1998 | Wildey | 144/24.13 |

FOREIGN PATENT DOCUMENTS

| | | |
|---|---|---|
| FI | PCT/FI99/00655 | 8/1999 |
| SE | 461824 | 4/1990 |
| SE | 509581 | 2/1999 |

* cited by examiner

*Primary Examiner*—W. Donald Bray
(74) *Attorney, Agent, or Firm*—Pillsbury Winthrop LLP

(57) ABSTRACT

The subject of the invention is a grapple harvester which is equipped with a felling and cutting device (14), a feeder (12) and delimbing devices (9, 10, 11, 13). The grapple harvester according to the invention is equipped with a bulk handling device (4) which is arranged to grip together several trees, which are usually gathered one by one and, preferably, whilst in the vertical position, for cutting by the grapple harvester.

8 Claims, 3 Drawing Sheets

GRAPPLE HARVESTER

CROSS-REFERENCE TO RELATED APPLICATIONS

This Application claims priority to International Application PCT/FI99/00655, filed Aug. 6, 1999, which is now International Publication Number WO 01/10190, the contents of which are incorporated herewith by reference.

BACKGROUND OF THE INVENTION

1. Field of the Invention

The subject of the invention is a grapple harvester which is equipped with a felling and cutting device, a feeder and delimbing devices.

2. Description of Related Art

As part of forest management the young trees should be thinned at various stages of growth. The harvesting of small, first thinning trees is, however, dependent on the cost of mechanised harvesting of the trees, and is not carried out if it is too expensive. Attempts to solve this problem include the harvesting and processing of several trees simultaneously. There are various bulk handling devices available with which trees can be gathered together into one bundle. An example of this type of device is presented in patent publication FI 88853. Similarly, there are grapple harvesters that can process several trees simultaneously with the kind of equipment presented in patent publication FI 97340. A problem, however, with this kind of harvester is that the tree can slip onto or past the cutting device when a new tree is taken into the harvester grapple. The tree contacting the cutting device is then cut again, resulting in short lengths being left in the forest.

Bulk handling devices are expensive specialist machinery designed for specific tasks and they are difficult to use and employ all year round. Although various contributing factors exist in other equipment, flexibility in forest operations is dependent on the bulk handling characteristics of the device not interfering with the normal handling of individual trees.

BRIEF SUMMARY OF THE INVENTION

One aspect of this invention is to introduce a grapple harvester with which the problems associated with present devices can be resolved. Another aspect of this invention is to speed up and facilitate the process of handling several trees simultaneously. Yet another aspect of this invention is to introduce a grapple harvester which can be used as a bulk handling device whilst, at the same time, retaining the grapple harvester normal grab such that the same unit is suited as it stands for use both in first thinning work and in final felling.

The purpose of the invention is achieved with a grapple harvester equipped with a bulk handling device which is arranged to grip together several trees, which are usually gathered one by one and, preferably, whilst in the vertical position, for cutting by the grapple harvester. Each tree is gripped by the bulk handling device while the next tree is gripped by normal equipment of the grapple harvester, so that during all stages of the work the grip on the trees is retained alternately by the collector gripping devices and the feeder and trimming devices of the harvester head. In this way these cannot slip onto or past the guide bar. When several trees can be gathered in the vertical position with the equipment, it can "bump" close to the next tree to be gripped so that the equipment functions in a stable manner. An advantage of the invention is that the bulk handling device is an attachment to the grapple harvester and does not interfere with the normal felling work of the grapple harvester, for example, on the final felling site, where the harvester head can be used as a normal grab.

In an advantageous arrangement of the invention, the bulk handling device is attached to the frame as an extension to the tilting arm, so distance from the felling and cutting devices and includes one or more gripping devices. In this way the bulk handling device, being sufficiently distant the other gripping and feeder devices, helps in directing the tree bundle parallel with the delimbing line so that the blades do not dig into the and delimbing is made easier. In some arrangements, the bulk handling equipment can be attached, for example, to the tilting arm or to some other part.

According to aspects of the invention, the bulk handling device advantageously includes dipping devices which hold the cut and gathered trees in tight grip and which can also gather new trees into their grip. When a suitable quantity of trees has been gathered in this way the tilting arm is released and, at the same time, the gripping devices open and let the tree bundle fall freely. The gathering gripping devices remain turned against the tilting arm when the are dropped into the threshing position, nor do they, in these circumstances, interfere with the delimbing.

In the bulk handling device according to the invention the gripping devices are equipped with separate extensions which are bent inwards. With these extensions the trees can be locked effectively into the bulk handling device.

BRIEF DESCRIPTION OF THE DRAWINGS

In the following, the invention is explained in more detail reference to the attached illustrations, in which:

FIG. 4 shows a cross section of the harvester according FIG. 1, viewed from above, at the location of the bulk handling device, with the gripping devices folded in.

DETAILED DESCRIPTION OF PREFERRED EMBODIMENTS

Figure 1:
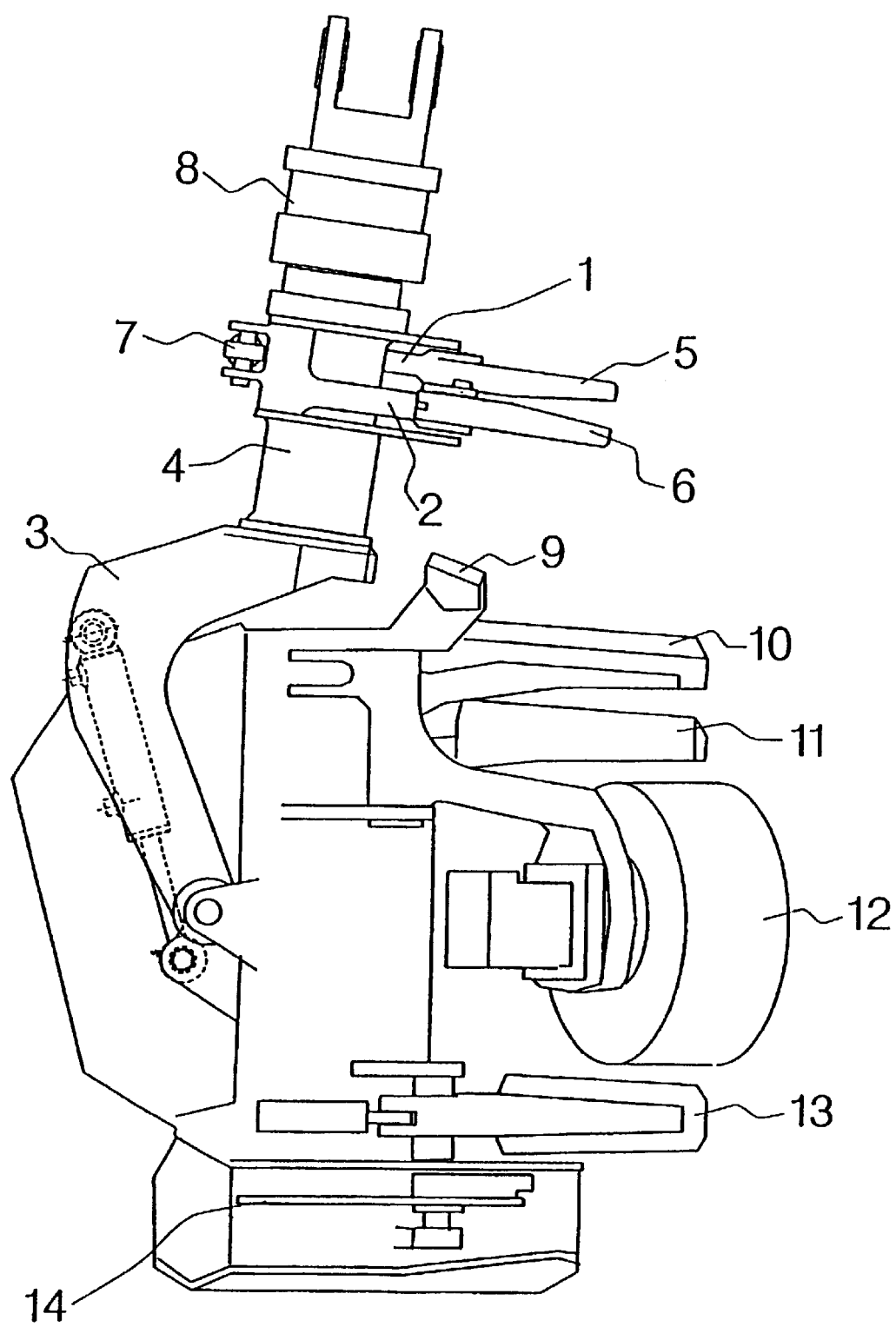
FIG. 1 shows a bulk handling harvester in the tree gripping position, viewed from the side.

FIG. 1 shows a single grip loader harvester equipped with the attachment 4 required for bulk handling. The grapple harvester includes the normal harvester equipment: delimbing devices 9,10,11, feeders 12, lower delimbing blade 13 and cutting device 14 which are swivel connected the tilting frame 3, i.e. the tilting arm. In addition, the equipment includes in normal manner the rotator 8, which connects the equipment to the working machinery such that it can rotate (not shown in the figure).

The cement in this arrangement is located between the tilting frame 3 of the grapple harvester and the rotator 8. Attached by bearings to both sides of the frame 4 of the attachment are separate gripping devices 1 and 2, on the ends of which are separate extension pieces bent inwards, i.e. points 5 and 6, with which the trees to be gathered can be gripped. The bulk handling device also includes an operating device 7 attached to the frame which, in this instance, is a hydraulic cylinder which is attached to the gripping devices 1, 2. The gripping devices are activated by the cylinder unit. The points 5 and 6 are fitted with spring units 1a and 2a to ensure their trouble free return. The spring units 1a and 2a are attached to the gripping devices 1 and 2 and points 5 and 6 with the purpose of keeping the points 5 and 6 in the same position relative to the gripping devices 1 and 2. The gripping devices 1 and 2 are arranged so that they do not turn together with the grapple harvester's delimbing and feeder devices.

Figure 2:
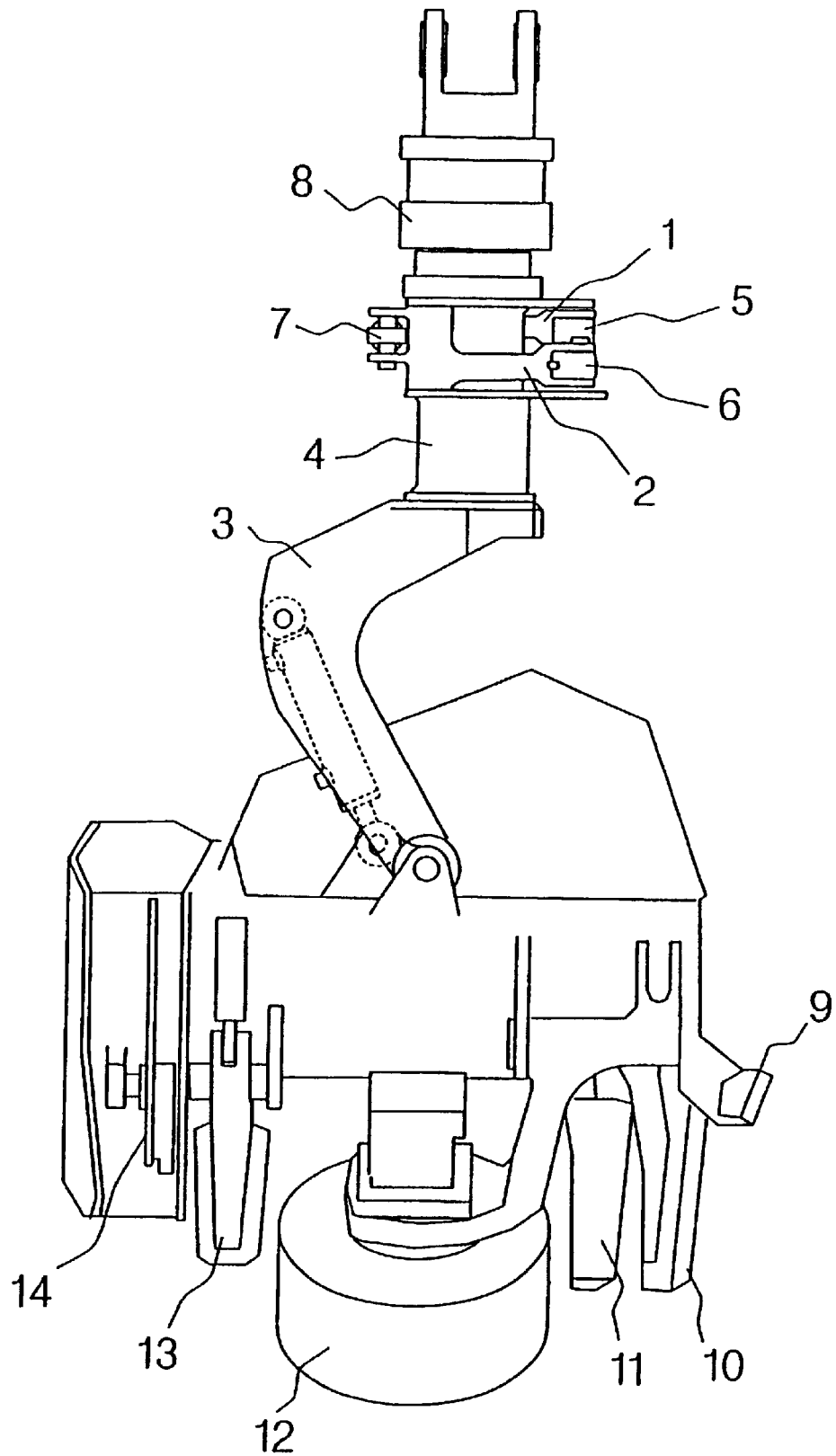
FIG. 2 shows a harvester according to FIG. 1, viewed from the side, when the harvester's tilting frame has been released and the tree bundle is processed.
Figure 3:
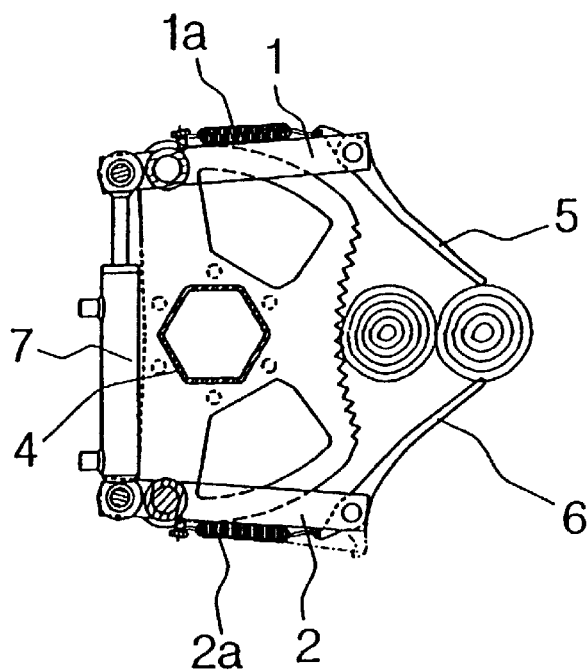
FIG. 3 shows a cross section of the harvester according FIG. 1, viewed from above, at the location of the bulk handling device, with the gripping devices gripping the tree.
Figure 4:
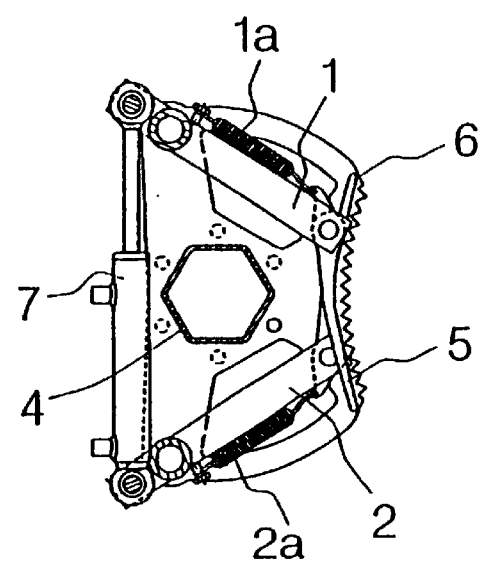
Figure 5:
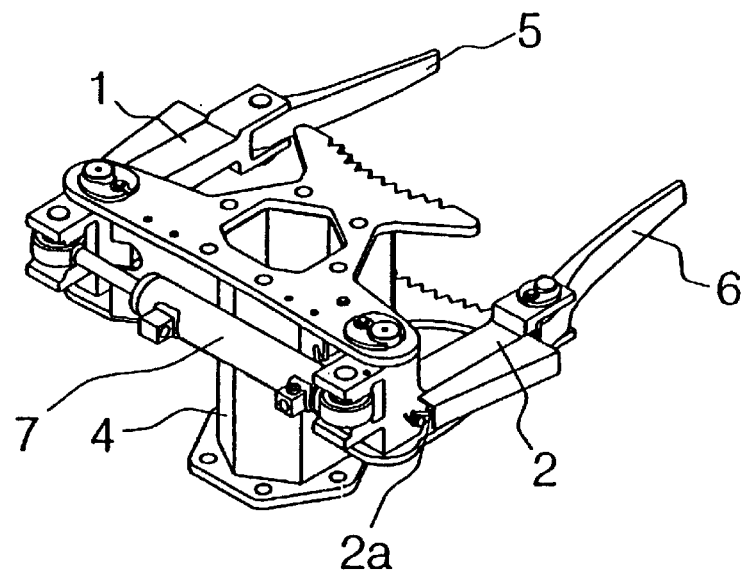
FIG. 5 shows the attachment according to FIG. 1, viewed at an angle from behind.

When using the grapple harvester, it is positioned next to the tree and the tree is gripped with the grapple harvester equipment and the bulk handling device. FIGS. 1 and 5 show the bulk handling device gripping devices 1, 2 in the gripping position. FIGS. 2 and 4 show the gripping devices 1, 2 in their closed position from which position the points 5, 6 move to sides, when the equipment is in use and when the gripping devices open, transfer onto the trunk of the first tree being felled and then onto the trunk of the second tree being felled and so on. FIG. 3 shows a harvester accord to FIG. 1 at the stage when the gripping devices are holding two gathered trees after the gripping devices have opened during the cutting stage and closed again. When the gripping units open they turn to the sides, and the tree can pass between the points 5 and 6 of the gripping devices. At this stage the tree is held by the other devices of the grapple harvest. After this, the gripping devices are closed and the equipment and gripping devices with their points are in position shown in FIG. 3, where the tree trunks remain in the bulk handling device.

FIG. 4 shows the bulk handling device in the stage when wood bundle is released from the bulk handling device and the gripping devices have returned from the gripping position to the closed position. Then they and the points 5 and 6 are against the frame of the bulk handling device and do not interfere with the use of the grapple harvester in other operations.

In other arrangements of the invention the bulk handling device can be located at some other position in the structure. It is also possible that the bulk handling device is a part of the tilting frame or the rotator.

The invention is not limited to the operating form described and many variations are possible within the framework of the invention concept.

What is claimed is:

1. A grapple harvester comprising: a bulk handling device; a felling and cutting device; a feeder device; and a delimbing device for delimbing trees which are gripped by said feeder device; wherein said bulk handling device includes at least one gripping device and is configured to grip together a plurality of trees collected individually or in groups for cutting by said grapple harvester; and wherein said bulk handling device is coupled as an extension to a tilting arm a distance from said felling and cutting device.

2. The grapple harvester as claimed in claim 1, wherein said bulk handling device includes at least two gripping devices which are turnable.

3. The grapple harvester as claimed in claim 2, wherein said gripping devices are arranged so as to turn independently of said delimbing device and said feeder device.

4. The grapple harvester as claimed in claim 2, wherein said gripping devices are located on opposite sides of said bulk handling device and are turnable in relation to said bulk handling device.

5. The grapple harvester as claimed in claim 3, wherein said gripping devices include separate extensions which are bent inwards toward each other.

6. The grapple harvester as claimed in claim 1, wherein said bulk handling device includes a spring unit coupled to said at least one gripping device and a respective extension of said gripping device to move said extension of said gripping device into the gripping position.

7. The grapple harvester as claimed in claim 1, wherein said bulk handling device further includes an operating device connected to said at least one gripping device to move said at least one gripping device.

8. The grapple harvester as claimed in claim 1, wherein said bulk handling device collects trees individually while said trees are in a vertical position.

* * * * *

UNITED STATES PATENT AND TRADEMARK OFFICE
CERTIFICATE OF CORRECTION

PATENT NO. : 6,691,751 B2
DATED : February 17, 2004
INVENTOR(S) : Kettunen et al.

It is certified that error appears in the above-identified patent and that said Letters Patent is hereby corrected as shown below:

Title page,
Insert Item -- [63]    Related U.S. Application Data
          Continuation of PCT/FI99/00655, filed August 6, 1999 --

Signed and Sealed this

Twenty-second Day of March, 2005

JON W. DUDAS
*Director of the United States Patent and Trademark Office*